United States Patent
Zeghidour et al.

(10) Patent No.: US 12,236,970 B2
(45) Date of Patent: *Feb. 25, 2025

(54) SEPARATING SPEECH BY SOURCE IN AUDIO RECORDINGS BY PREDICTING ISOLATED AUDIO SIGNALS CONDITIONED ON SPEAKER REPRESENTATIONS

(71) Applicant: Google LLC, Mountain View, CA (US)

(72) Inventors: Neil Zeghidour, Paris (FR); David Grangier, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/967,726

(22) Filed: Oct. 17, 2022

(65) Prior Publication Data
US 2023/0112265 A1    Apr. 13, 2023

Related U.S. Application Data

(63) Continuation of application No. 17/170,657, filed on Feb. 8, 2021, now Pat. No. 11,475,909.
(Continued)

(51) Int. Cl.
*G10L 21/028*    (2013.01)
*G06N 3/045*    (2023.01)
(Continued)

(52) U.S. Cl.
CPC ............ *G10L 21/028* (2013.01); *G06N 3/045* (2023.01); *G06N 3/08* (2013.01); *G10L 17/04* (2013.01);
(Continued)

(58) Field of Classification Search
None
See application file for complete search history.

(56) References Cited

U.S. PATENT DOCUMENTS

2019/0066713 A1*  2/2019  Mesgarani ........... H04R 25/507
2019/0318725 A1* 10/2019  Le Roux ................. G10L 15/16
(Continued)

FOREIGN PATENT DOCUMENTS

WO    WO 2019104229 A1    5/2019

OTHER PUBLICATIONS

Katerina Zmollikova, Marc Delcroix, Keisuke Kinoshita, Takuya Higuchi, Atsunori Ogawa, Tomohiro Nakatani "Learning Speaker Representation for Neural Network Based Multichannel Speaker Extraction" URL: https://ieeexplore.ieee.org/stamp/stamp.jsp?tp=&arnumber=8268910&tag=1 (Year: 2017).*
(Continued)

*Primary Examiner* — Richa Sonifrank
(74) *Attorney, Agent, or Firm* — Fish & Richardson P.C.

(57) ABSTRACT

Methods, systems, and apparatus, including computer programs encoded on computer storage media, for performing speech separation. One of the methods includes obtaining a recording comprising speech from a plurality of speakers; processing the recording using a speaker neural network having speaker parameter values and configured to process the recording in accordance with the speaker parameter values to generate a plurality of per-recording speaker representations, each speaker representation representing features of a respective identified speaker in the recording; and processing the per-recording speaker representations and the recording using a separation neural network having separation parameter values and configured to process the recording and the speaker representations in accordance with the separation parameter values to generate, for each speaker representation, a respective predicted isolated audio signal that corresponds to speech of one of the speakers in the recording.

21 Claims, 3 Drawing Sheets

Related U.S. Application Data

(60) Provisional application No. 62/971,632, filed on Feb. 7, 2020.

(51) Int. Cl.
| | |
|---|---|
| *G06N 3/08* | (2023.01) |
| *G10L 17/04* | (2013.01) |
| *G10L 17/18* | (2013.01) |
| *G10L 21/0208* | (2013.01) |
| *G10L 21/0272* | (2013.01) |
| *G10L 21/0316* | (2013.01) |
| *G10L 25/30* | (2013.01) |

(52) U.S. Cl.
CPC .......... *G10L 17/18* (2013.01); *G10L 21/0208* (2013.01); *G10L 21/0272* (2013.01); *G10L 21/0316* (2013.01); *G10L 25/30* (2013.01); *G10L 2021/02087* (2013.01)

(56) References Cited

U.S. PATENT DOCUMENTS

| | | |
|---|---|---|
| 2020/0043508 A1 | 2/2020 | Song et al. |
| 2021/0019556 A1 | 1/2021 | Ganguly |
| 2021/0074266 A1 | 3/2021 | Lu |

OTHER PUBLICATIONS

Yi Liu, Liang He, Jia Liu; Large Margin Softmax Loss for Speaker Verification https://arxiv.org/pdf/1904.03479.pdf (Year: 2019).*
Yi Luo, Nima Mesgarani; Conv-TasNet: Surpassing Ideal Time-Frequency Magnitude Masking for Speech Separation https://arxiv.org/pdf/1809.07454v3.pdf (Year: 2019).*
Andreotti et al, "An open-source framework for stress-testing non-invasive foetal ecg extraction algorithms," Physiological measurement, 2016, 23 pages.
Araki et al, "Underdetermined blind speech separation with directivity pattern based continuous mask and ica," IEEE, 2004, 4 pages.
Ba et al, "Layer normalization," arXiv, 2016, 14 pages.
Barker et al, "The fifth 'chime' speech separation and recognition challenge: Dataset, task and baselines," Interspeech, 2018, 5 pages.
Bernardes et al, "The persistent challenge of foetal heart rate monitoring," Current Opinion in Obstetrics and Gynecology, 2010, 6 pages.
Chen et al, "Deep attractor network for single-microphone speaker separation," IEEE, 2017, 5 pages.
Cosentino et al, "Librimix: An open-source dataset for generalizable speech separation," arXiv, 2020, 5 pages.
D'efossez et al, "Demucs: Deep extractor for music sources with extra unlabeled data remixed,"arXiv, 2019, 12 pages.
github.com [online], "Conv TasNet" 2020, retrieved on Mar. 11, 2021, retrieved from URL <https://github.com/kaituoxu/Conv-TasNet>, 3 pages.
github.com [online], "Dual path RNNs DPRNNs based speech separation" 2020, retrieved on Mar. 11, 2021, retrieved from URL <https://github.com/ShiZiqiang/dual-path-RNNs-DPRNNs-based-speech-separation>, 5 pages.
Griffin et al, "Signal estimation from modified short-time fourier transform," IEEE, 1984, 8 pages.
He et al, "Delving deep into rectifiers: Surpassing human-level performance on imagenet classification," arXiv, 2015, 11 pages.
Hershey et al, "Single-Channel Multi-Speaker Separation using Deep Clustering" MERL, 2017, 6 pages.
Hershey et al, "Deep clustering: Discriminative embeddings for segmentation and separation," IEEE, 2016, 5 pages.
Hershey et al, "Novel deep architectures in speech processing," New Era for Robust Speech Recognition, 2017, 30 pages.
IN Office Action in Indian Appln. No. 202227044582, dated Nov. 9, 2022, 5 pages (with English Translation).
International Preliminary Report on Patentability in International Appln. No. PCT/US2021/017121, dated Aug. 18, 2022, 8 pages.
Isik et al, "Single-channel multi-speaker separation using deep clustering," arXiv, 2016, 5 pages.
Karvounis et al, "A non-invasive methodology for fetal monitoring during pregnancy," Methods of information in medicine, 2010, 16 pages.
Kavalerov et al, "Universal Sound Separation" arXiv, 2019, 5 pages.
Kingma et al, "Adam: A method for stochastic optimization," arXiv, 2015, 15 pages.
Kolbaek et al, "Multitalker speech separation with utterance-level permutation invariant training of deep recurrent neural networks," IEEE, 2017, 12 pages.
Lam et al, "Mixup-breakdown: a consistency training method for improving generalization of speech separation models," arXiv, 2019, 6 pages.
Li et al, "Cbldnn-based speaker-independent speech separation via generative adversarial training," IEEE, 2018, 5 pages.
Linde et al, "An algorithm for vector quantizer design," IEEE Transactions on communications, 1980, 12 pages.
Liu et al, "Divide and conquer: A deep casa approach to talker-independent monaural speaker separation," arXiv, 2019, 10 pages.
Luo et al, "Dual-path rnn: efficient long sequence modeling for time-domain single-channel speech separation," arXiv, 2019, 5 pages.
Luo et al, "Conv-TasNet: Surpassing Ideal Time-Frequency Magnitude Masking for Speech Separation" IEEE, 2019, 12 pages.
Luo et al, "Conv-tasnet: Surpassing ideal time-frequency magnitude masking for speech separation," arXiv, 2019, 12 pages.
Luo et al, "Speaker-independent speech separation with deep attractor network," IEEE, 2018, 11 pages.
Luo et al, "Tasnet: Time-domain audio separation network for real-time, single-channel speech separation," arXiv, 2018, 5 pages.
Maciejewski, et al, "Whamr!: Noisy and reverberant single-channel speech separation," arXiv, 2019, 5 pages.
Mccowan et al, "The ami meeting corpus," Proceedings Measuring Behavior, 2005, 5 pages.
Murray et al, "An electrical load measurements dataset of united kingdom households from a two-year longitudinal study," Scientific data, 2017, 12 pages.
Nachmani et al, "Voice separation with an unknown number of multiple speakers," arXiv, 2020, 12 pages.
Panayotov et al, "Librispeech: an asr corpus based on public domain audio books," IEEE International Conference on Acoustics, Speech, and Signal Processing, 2015, 5 pages.
Pariente et al, "Filterbank design for end-to-end speech separation," arXiv, 2019, 5 pages.
PCT International Search Report and Written Opinion in International Application No. PCT/US2021/017121, dated May 12, 2021, 15 pages.
Perez et al, "Film: Visual reasoning with a general conditioning layer," Thirty-Second AAAI Conference on Artificial Intelligence, 2018, 10 pages.
Raffel et al, "mir_eval: A Transparent Implementation of Common MIR Metrics" 15th International Society for Music Information Retrieval Conference, 2014, 6 pages.
Rafii, et al, "MUSDB18—corpus for music separation," HAL archives ouvertes, 2017, 3 pages.
Roux et al, "SDR—half-baked or well done?" arXiv, 2018, 5 pages.
Roweis, "One microphone source separation," NIPS, 2001, 7 pages.
Sablayrolles et al, "Spreading vectors for similarity search," ICLR, 2019, 13 pages.
Shallue et al, "Identifying exoplanets with deep learning: A five-planet resonant chain around kepler-80 and an eighth planet around kepler-90," The Astronomical Journal, 2018, 21 pages.
Shehu et al, "Sokoto coventry fingerprint dataset" arXiv, 2018, 3 pages.
Silva et al, "Noninvasive fetal ecg: the physionet/computing in cardiology challenge 2013," Computing in Cardiology, 2013, 4 pages.
Srivastava et al, "Dropout: a simple way to prevent neural networks from overfitting" The Journal of Machine Learning Research, 2014, 30 pages.

(56) References Cited

OTHER PUBLICATIONS

Sutha et al, "Fetal electrocardiogram extraction and analysis using adaptive noise cancellation and wavelet transformation techniques," Journal of medical systems, 2018, 18 pages.
Toumi et al, "A review of blind source separation in nmr spectroscopy," Progress in nuclear magnetic resonance spectroscopy, 2014, 85 pages.
Uhlich et al, "Improving music source separation based on deep neural networks through data augmentation and network blending," IEEE, 2017, 5 pages.
Van den Oord et al, "Wavenet: A generative model for raw audio," arXiv, 2016, 15 pages.
Vincent et al, "Performance measurement in blind audio source separation," IEEE, 2006, 8 pages.
Wan, et al, "Generalized end-to-end loss for speaker verification," arXiv, 2018, 5 pages.
Wang et al, "Alternative objective functions for deep clustering," ICASSP, 2018, 7 pages.
Wang et al, "End-to-end speech separation with unfolded iterative phase reconstruction," arXiv, 2018, 5 pages.
Wang et al, "Supervised speech separation based on deep learning: An overview," IEEE, 2018, 27 pages.
Wang, "Voicefilter: Targeted voice separation by speaker-conditioned spectrogram masking," arXiv, 2019, 5 pages.
Weng et al, "Deep neural networks for single-channel multi-talker speech recognition," IEEE, 2015, 10 pages.
Wichern et al, "Wham!: Extending speech separation to noisy environments," arXiv, 2019, 5 pages.
Xu et al, "Single channel speech separation with constrained utterance level permutation invariant training using grid LSTM," IEEE, 2018, 5 pages.
Yilmaz et al, "Blind separation of speech mixtures via time-frequency masking," IEEE, 2004, 18 pages.
Yu et al "Permutation invariant training of deep models for speaker-independent multi-talker speech separation," arXiv, 2017, 5 pages.
Yu et al, "Multi-scale context aggregation by dilated convolutions," arXiv, 2016, 13 pages.
Zeghidour et al, "Joint learning of speaker and phonetic similarities with siamese networks," Interspeech, 2016, 5 pages.
Zhang et al, Furcanext: End-to-end monaural speech separation with dynamic gated dilated temporal convolutional networks, arXiv, 2019, 11 pages.
Zhang et al, "mixup: Beyond empirical risk minimization," arXiv, 2018, 13 pages.
Office Action in European Appln. No. 21710117.9, issued Jul. 4, 2024, 4 pages.

* cited by examiner

SEPARATING SPEECH BY SOURCE IN AUDIO RECORDINGS BY PREDICTING ISOLATED AUDIO SIGNALS CONDITIONED ON SPEAKER REPRESENTATIONS

CROSS-REFERENCE TO RELATED APPLICATIONS

This is a continuation of U.S. application Ser. No. 17/170,657, filed on Feb. 8, 2021, which claims priority to U.S. Provisional Application No. 62/971,632, filed on Feb. 7, 2020. The disclosures of the prior applications are considered part of and are incorporated by reference in the disclosure of this application.

BACKGROUND

This specification relates to using a neural network to perform automatic speech separation.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes technologies for automatic speech separation. These technologies generally involve receiving an audio recording of speech from multiple speakers and generating isolated audio signals that each represent speech from one of the multiple speakers in the recording. A system implementing techniques described in this specification can process a recording to obtain, for each identified speaker, a per-recording representation including features of the speaker. The system can then process the per-recording speaker representations with the recording to obtain isolated audio signals that each correspond to speech of one of the identified speakers.

Particular embodiments of the subject matter described in this specification can be implemented so as to realize one or more of the following advantages.

Techniques described in this specification allow for generating isolated speech signals from a single recording of multiple speakers. Speech can be separated from the single recording even when the audio is recorded from a single recording device, and without annotations or additional information identifying how many speakers are being recorded, or which part of the recording is attributed to which speaker.

Using the techniques described in this specification, speech can be effectively separated and identified in both clean and noisy background settings. Speech can also be separated for each speaker without requiring any previous or reference recordings of speech from any of the speakers prior to receiving an input recording for processing.

A machine learning model predicting features for speakers in an input recording can be trained jointly with a model generating isolated audio signals according to the predicted features, which can improve both the accuracy of the model predicting features for the speakers as well as the model generating isolated audio signals according to the predicted features and an input recording. The techniques described in this specification can improve audio separation quality for longer recordings, because a learned speaker representation can include features learned across the entire recording rather than a specific window of time within the recording.

Speech separation as described in this specification can be used to identify and isolate a particular speaker from a mixed-speech recording, or can be used as an intermediate processing step, e.g., as preprocessing input for a speech recognition system. A system implementing the techniques described in this specification can be trained to identify speakers even when the speakers have not been previously encountered by the system.

A machine learning model trained to process mixed recordings, e.g., a model implemented by techniques described in this specification, can be trained for better performance at inference by sampling short windows of audio as training examples from a training dataset, and augmenting the sampled audio by reweighting the audio with randomly sampled gains. A model trained by the augmented audio can be more robust and efficient at performing speech separation during inference, and augmentation as described can be applied to any speech training dataset with minimal configuration. Additional training data can be easily generated by augmenting existing training data on even relatively small training datasets according to the techniques described in this specification.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes a system of one or more computers in one or more physical locations that uses a speaker neural network and a separation neural network to perform speech separation on a received recording.

Figure 1:
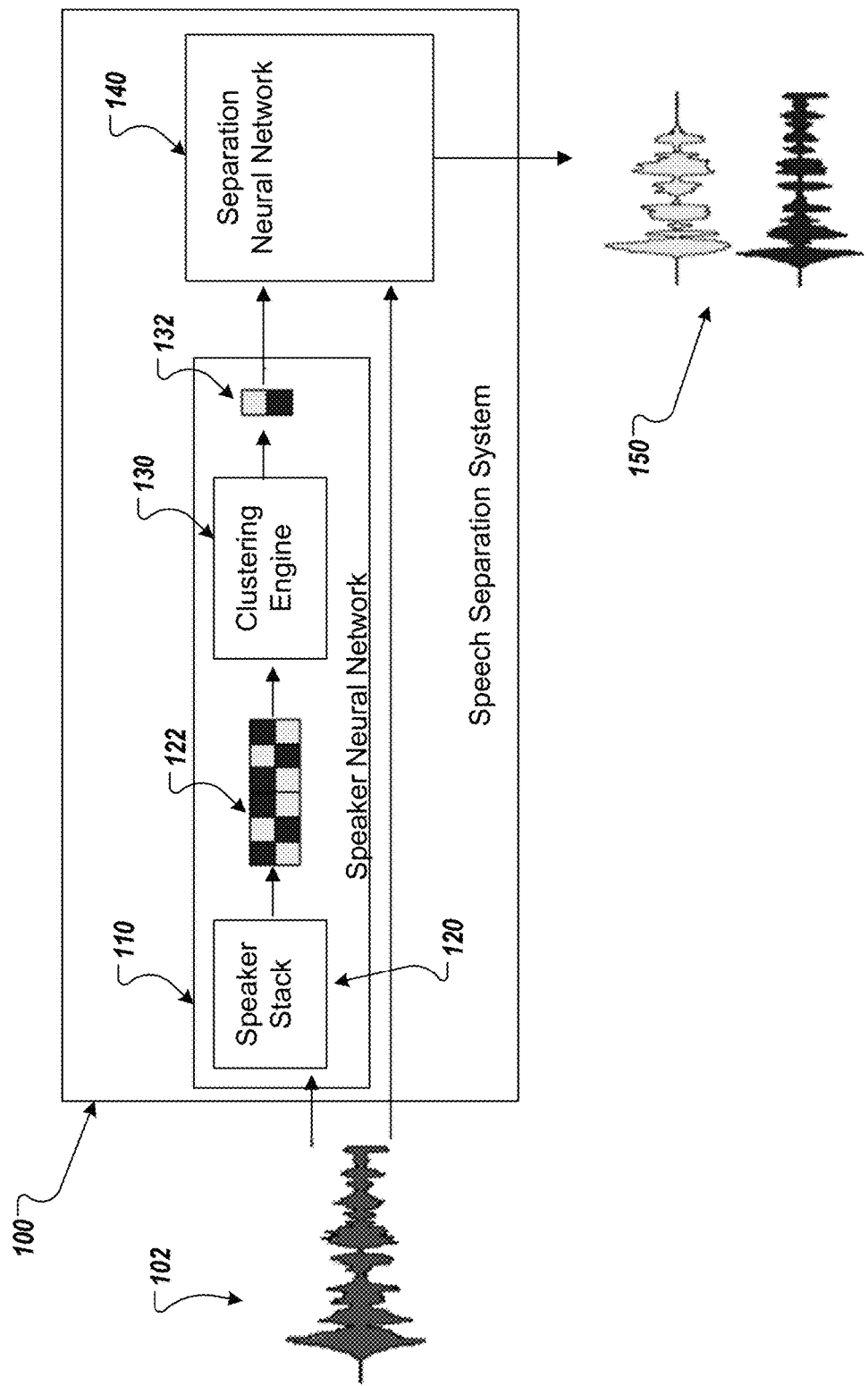
FIG. 1 shows an example speech separation system.

FIG. 1 shows an example speech separation system 100. The speech separation system 100 is an example of a system implemented as computer programs on one or more computers in one or more locations, in which the systems, components, and techniques described below can be implemented.

The system 100 can receive a recording 102 including speech from a plurality of speakers. The recording 102 can be of speakers speaking in sequence, but can also include periods of time during which multiple speakers are speaking at the same time (i.e., overlapping or "mixed" speech).

A speaker is a source of speech, e.g., a person or a digital audio speaker, for example a speaker for a computer monitor or a speaker of a public announcement system. In the case of digital audio speakers, the speech can be previously recorded or part of a live broadcast.

The recording 102 can be recorded from a single audio capture device, e.g., a single microphone, or from multiple audio capture devices located at various locations in an environment.

As a particular example, the recording 102 can be captured by a microphone of a mobile device or a smart device, e.g., a smart speaker, and the system 100 can be implemented as one or more computer programs on the mobile device or the smart device.

As another particular example, the recording 102 can be captured by a microphone of a mobile device or a smart device, e.g., a smart speaker, and the system 100 can be implemented as one or more computer programs on one or more computers in the cloud and can receive the recording over a communication network from the mobile device or the smart device.

Generally, the recorded audio in the recording 102 can include background noise in addition to the speech recorded of the multiple speakers. In some cases, the recording 102 received by the system 100 is of reverberated audio, e.g., of echoing speech as a result of the recording made in an environment with appropriate acoustic conditions for reverberation, e.g., a cave.

Speech in the recording 102 can be natural, i.e., originating from a person, either live at the location in which the recording was made or transmitted by any suitable technique to the location at which the recording was made, or synthetic, e.g., generated by one or more computers implementing any suitable technique for voice synthetization.

The system 100 can also receive recordings in real time, for example during an audio or audiovisual broadcast. In some implementations, the system 100 continues receiving a recording until receiving an indication that the broadcast has ended and then processes the completed recording. Alternatively, the system 100 segments audio according to a pre-determined temporal length, and processes earlier segments of audio in parallel with receiving current segments.

The system 100 processes the recording 102 using a speaker neural network 110. The speaker neural network 110 is a neural network having parameters ("speaker parameters") and configured to process the recording 102 in accordance with the values of those parameters ("speaker parameter values") to generate a plurality of per-recording speaker representations 132.

Each per-recording speaker representation 132 represents features of a speaker identified by the speaker neural network 110 as speaking in the recording.

Each per-recording speaker representation 132 is an aggregation of per-time step speaker representations 122 generated by the speaker neural network 110 at each time step that the recording spans.

In particular, for each time step, the speaker neural network 110 generates a respective per-time step speaker representation 122 for each identified speaker by processing the recording through a speaker stack 120 in accordance with the speaker parameter values. A "stack" as used in this specification is a collection of neural network layers.

The speaker neural network 110 can then use a clustering engine 130 to aggregate the per-time step speaker representations 122 for a speaker to generate the speaker representations 132.

For example, the clustering engine 130 can cluster the per-time step speaker representations, e.g., using k-means clustering or another conventional clustering technique, and obtain a centroid for each of a fixed number of clusters, with each cluster representing a different speaker. The neural network 110 can then use the centroids of the clusters as the speaker representations 132.

After the speaker neural network 110 generates the per-recording speaker representations 132 for identified speakers in the recording 102, the system 100 processes the per-recording speaker representations 132 and the input recording 110 using a separation neural network 140.

The separation neural network 140 is a neural network having parameters ("separation parameters") and configured to process the speaker representations 132 and the recording 110 in accordance with the values of those parameters ("separation parameter values") to generate a respective predicated isolated audio signal 140 for each per-recording speaker representation 132, i.e., that corresponds to speech of the speaker represented by the per-recording speaker representation 132 in the recording 102.

An isolated audio signal is a reconstruction of speech of a respective speaker in the recording. The isolated audio signal can be generated in any suitable form, e.g., as a waveform.

Once generated, the system 100 can send the isolated audio signals 150 as output, e.g., to a client device in response to a request from the client device to process an input recording.

In some implementations, the system 100 is communicatively coupled with another system, e.g., a speech recognition system, which can be configured to receive the isolated audio signals as input for additional processing, e.g., for performing speech recognition on each of the received isolated audio signals 150 individually.

Prior to using the speaker neural network 110 and the separation neural network 140 for speech separation, the system 100 or another system can train the speaker neural network 110 and the separation neural network 140 jointly on training data to determine trained speaker parameter values and trained separation parameter values.

The training data includes a set of training recordings that collectively include speech from a plurality of training speakers. Each training recording is associated with a respective isolated speech signal for each speaker in the recording and each isolated speech signal is annotated with an identifier for the speaker (from the plurality of training speakers) to whom the signal corresponds.

Training the neural network 110 and the neural network 140 is described below with reference to FIG. 3.

While this specification generally refers to recordings including speech spoken by speakers, the described techniques are equally applicable for separating other types of recordings that include a mixture of multiple signals from different sources. As a particular example, the described techniques could additionally be applied to Electrocardiogram (ECG) data, which reports voltage time series of the electrical activity of the heart from electrodes placed on the skin. During pregnancy, ECG informs about the function of the fetal heart but maternal and fetal ECG are mixed. The described techniques could then be used to separate the maternal and fetal ECG from a single noisy electrode recording of the mixed ECG. Thus, more generally, the described techniques can be used to receive a "recording" that is a time series (i.e., a data set) characterizing a particular type of signal, e.g., audio, image, video or voltage data, that is a mixture of multiple individual signals (e.g., from different sources) and to generate as output multiple predicted isolated signals that each isolate a respective one of the individual signals. In this way, the techniques may be operable to analyze, e.g., audio, data in order to provide output reflective of the analysis.

Figure 2:
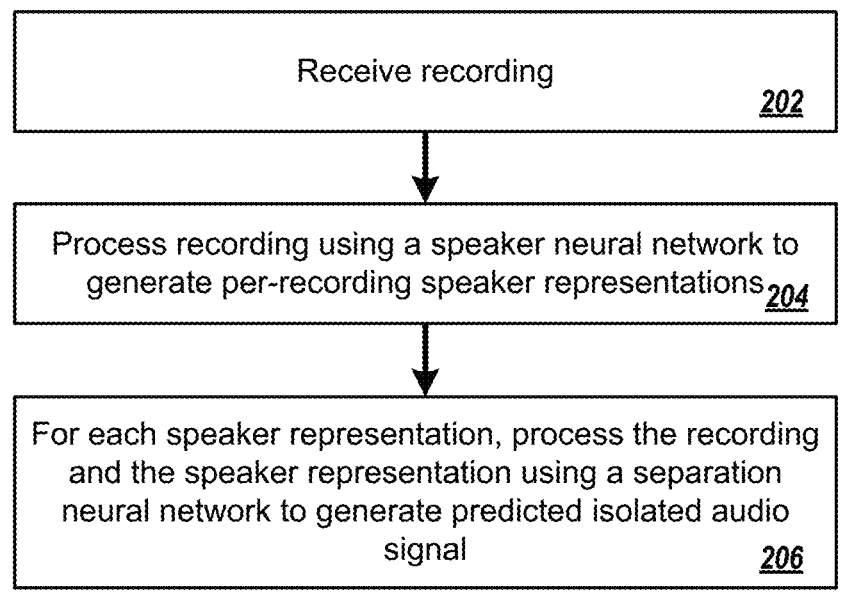
FIG. 2 is a flow diagram of an example process for generating predicted isolated audio signals for a received recording.

FIG. 2 is a flow diagram of an example process 200 for generating predicted isolated audio signals for a received recording. For convenience, the process 200 will be described as being performed by a system of one or more computers located in one or more locations. For example, a speech separation system, e.g., the speech separation system 100 of FIG. 1, appropriately programmed, can perform the process 200.

The system obtains a recording that represents speech from a plurality of speakers (step 202).

The system processes the recording using a speaker neural network, i.e., using a neural network having parameters and configured to process the recording in accordance with the values of those parameters ("speaker parameter values") to generate a plurality of per-recording speaker representations (step 204).

Generally, the speaker neural network is configured to generate a fixed number N of per-recording speaker representations, where N is a fixed integer greater than one.

At least some of those per-recording speaker representations represent features of a respective identified speaker in the recording. When the fixed number is greater than the total number of speakers in the recording, the remainder of the per-recording speaker representations can represent that there is no corresponding speaker, e.g., can be a representation of a silent audio track.

More specifically, the speaker neural network first generates, for each time-step of the recording, a plurality of per-time step speaker representations.

In particular, the speaker neural network processes the recording using a speaker stack of neural network layers to generate N per-time step speaker representations for each time step. Each per-time step speaker representation is a vector that represents features of a respective identified speaker in the recording at the time step.

As a particular example, the speaker stack can be a stack of residual convolutional blocks. Each residual convolutional block can process an input to the block, i.e., the output of the previous block in the stack or, for the first block in the stack, the recording, through a dilated convolution, followed by a non-linearity, e.g., a parametric rectified linear unit, and followed by a layer normalization operation to generate an initial output. The block can then sum the block input and the initial output to generate the final output to the block. Optionally, the speaker stack can include a final layer that that receives the output of the final block in the stack and applies normalization, e.g., Euclidean normalization, to the output in order to generate the per-time step representations.

The per-time step representations are not required to order speakers consistently across a sequence. For example, a given speaker Bob could be represented by the first vector in the set of per-time step representation at time step t but by a second vector at a different time step $t_0$.

The speaker neural network then generates the plurality of per-recording speaker representations by aggregating the generated per-time step speaker representations to generate a respective speaker representation for the identified speaker.

The speaker stack produces speaker representations at each time step and then performs an aggregation over the whole sequence. Precisely, the speaker stack first maps the input $x = x_{t=1}^T$ into N same-length sequences of latent vectors of dimension d, i.e.

$$\{h^i\}_{i=1}^N = h(x),$$

w$\forall i, h^i \in \mathbb{R}^{T \times d}$. N is chosen to upper bound the maximum number of simultaneous speakers targeted by the system, while d is a hyper-parameter selected by cross-validation. Intuitively, h produces a latent representation of each speaker at every time step. When n<N speakers are present at a time-step, h produces a latent representation of silence for the N−n remaining outputs. It is important to note that h is not required to order speakers consistently across a sequence. E.g., a given speaker Bob could be represented by the first vector $h_t^1$ at time t and by the second vector $h_{t'}^2$ at a different time t'. At the end of the sequence, the aggregation step groups all produced vectors by speaker and outputs N summary vectors for the whole sequence. K-means performs this aggregation at inference (Linde et al., 1980) and returns the centroids of the N identified clusters, $$c = \{c_i\}_{i=1}^N = k\text{means}(\{h_t^i\}_{i,t}; N).$$

During training, the aggregation is derived from a speaker training objective. In the following, we refer to the local vectors $h_t^i$ as the speaker vectors, and to the vectors $c_i$ as the speaker centroids.

Because there is no imposed order among the representations at any given time step, at inference, the system performs clustering, e.g., K-means clustering, to cluster the per-time step representations into N clusters and uses the centroid of each cluster as one of the per-recording speaker representations.

As will be described in more detail below with reference to FIG. 3, during training clustering is not used and the per-recording speaker representations are instead derived by grouping per-time step speaker representations by speaker identity.

The system then processes the per-recording speaker representations and the recording using a separation neural network, i.e., using a neural network having parameters and configured to process the recording and the speaker representations in accordance with the values of those parameters ("separation parameter values") to generate, for each of the speaker representations, a respective predicted isolated audio signal that corresponds to speech of one of the speakers in the recording (step 206). That is, the separation neural network receives as input the N speaker representations and the recording and generates as output N isolated audio signals.

When there are N speakers in the recording, each isolated audio signal will correspond to one of the N speakers. When there are fewer than N speakers, the remaining isolated audio signals can be, e.g., a silent audio track.

As a particular example, the separation neural network can also be a stack of residual convolutional blocks, but with each block being conditioned on the speaker representations instead of just processing the output of the previous block (or, for the first block in the stack, the recording).

As a particular example, each block can be conditioned on the speaker representations through FiLM, Feature-wise Linear Modulation. When using FiLM, the output of the dilated convolution within each block is processed through a linear transformation that is dependent on the speaker representations before being provided to the non-linearity. In particular, the system can, for each block, apply two separate learned linear projections to the concatenation of the speaker representations to generate a first vector and a second vector. The system can then compute an element-wise product between the first vector and the output of the dilated convolution and then add the second vector to the element-wise product to generate the input to the non-linearity.

Figure 3:
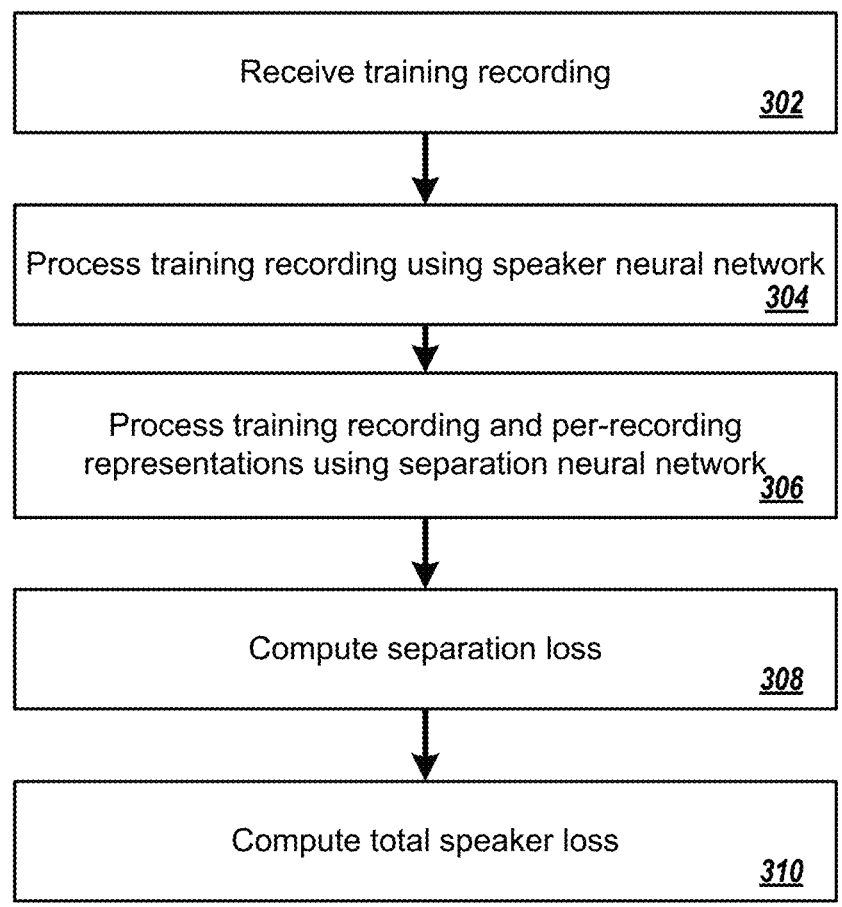
FIG. 3 is a flow diagram of an example process for training the separation neural network and the speaker neural network.

FIG. 3 is a flow diagram of an example process 300 for jointly training the speaker neural network and the separation neural network. For convenience, the process 300 will be described as being performed by a system of one or more computers located in one or more locations. For example, a speech separation system, e.g., the speech separation system 100 of FIG. 1, appropriately programmed, can perform the process 300.

As described above, the system trains the neural network on annotated training data that includes a set of training recordings that collectively include speech from a plurality of training speakers. Each training recording is associated with a respective isolated speech signal for each speaker in the recording and each isolated speech signal is annotated with an identifier for the speaker (from the plurality of training speakers) to whom the signal corresponds.

The system can use the annotations during training to mitigate permutation ambiguity in identified speakers that is commonly associated with speech separation machine learning tasks can be mitigated. Using the annotations, the separation neural network can receive per-recording speaker representations in a consistent ordering, preventing the network from having to choose a latent ordering of the speakers during training.

The annotated training data allows the speaker neural network to infer a per-recording speaker representation per speaker such that the inter-speaker distance of identified features is large, while the intra-speaker distance of identified features, i.e., features for a particular speaker, is small. Also, by training the separation and speaker neural networks jointly, the speaker neural network can learn a speaker representation per speaker that can improve the accuracy of the resulting isolated audio signal generated by the separation neural network receiving the speaker representations as input.

In particular, the system can repeatedly perform the process 300 on mini-batches of training recordings, with each mini-batch including one or more training recordings, to repeatedly update the parameter values of the neural networks.

The system receives a training recording (step 302). The training recording training recording is associated with a respective isolated speech signal for each speaker in the recording and each isolated speech signal is annotated with an identifier for the speaker (from the plurality of training speakers) to whom the signal corresponds. These speakers will be referred to as the annotated speakers for the training recording.

The system processes the training recording using the speaker neural network to generate a respective plurality of per-time step speaker representations for each time step and to aggregate the per-time step speaker representations to generate a plurality of per-recording speaker representations (step 304).

In particular, rather than performing clustering as would be done at inference, i.e., after training, the system uses the annotations to generate the per-recording speaker representations.

In other words, the system uses the annotations to order the per-time step speaker representations according to a predetermined ordering, i.e., to identify, for each annotated speaker and for each time step, the per-time step speaker representation that is associated with that speaker. The system then aggregates the per-time step speaker representations by, for each speaker, averaging the per-time step speaker representations that are associated with that speaker across the time steps to generate the per-recording representation for the speaker.

In more detail, during training, the system maintains an embedding table, i.e., a table of embeddings for each of the plurality of training speakers, i.e., a respective embedding for each speaker appearing in the training dataset that the system uses to train the neural networks.

For each of the time steps, the system then determines an assignment of per-time step representations, i.e., an assignment that associates each per-time step representation at the time with a different one of the annotated speakers, by selecting the assignment that minimizes an overall speaker loss that depends on, e.g., is the sum of, an individual speaker loss that, for each speaker, depends on at least the embedding of the annotated speaker in the embedding table and the per-time step representations.

The system can use any of a variety of individual speaker losses that measure the similarity between an embedding and a per-time step representation.

As one example, the system can use a distance loss. The distance loss favors small distances between a speaker vector and the corresponding embedding while enforcing the distance between different speaker vectors at the same time-step to be larger than a margin.

For example, the distance loss between an embedding $E_{s_i}$ for a speaker $s_i$ and the j-th representation $h_t^j$ at time step t can satisfy:

$$\|h_t^j - E_{s_i}\|^2 + \Sigma_{k \neq j}(\max(0, 1 - \|h_t^j - h_t^k\|^2)),$$

where the sum is over all other per-time step representations at time step t (except j).

As another example, the system can use a local classifier loss which discriminates among the speakers present in the sequence. The local classifier loss relies on the log softmax over the distances between per time step representations and embeddings and can satisfy:

$$d(h_t^j, E_{s_i}) + \log \Sigma_{k=1}^N \exp(-d(h_t^j, E_{s_k})),$$

where the sum is over the N annotated speakers for the training recording and $d(h_t^j, E_{s_i}) = \alpha \|h_t^j - E_{s_i}\|^2 + \beta$, where $\alpha$ and $\beta$ are learned scalar parameters.

As yet another example, the system can use a global classifier loss which discriminates among all of the speakers identified in the embedding table and can satisfy:

$$d(h_t^j, E_{s_i}) + \log \Sigma_{k=1}^M \exp(-d(h_t^j, E_{s_k})),$$

where the sum is over all of the speakers identified in the embedding table.

In sum, the system determines the per-recording representation for any given assigned speaker by aggregating, e.g., averaging, the per-time step representations that were associated with the given assigned speaker in the assignments for the time steps.

The system processes the training recording and the per-recording speaker representations using the separation neural network to generate a plurality of predicted isolated audio signals (step 306).

The system then computes a separation loss that measures an error between (i) predicted isolated audio signals generated by the separation neural network using the predicted speaker representations of speakers in the training recording generated from the speaker neural network, and (ii) ground truth audio signals each corresponding to isolated speech of one of the speakers in the input recording (step 308).

The error can be computed according to any suitable objective function measuring speech separation quality, e.g., using signal-to-distortion ratio (SDR) or scale-invariant SDR (SI-SDR).

The separation loss is chosen to measure the error between predicted and ground truth isolated audio signals up to a permutation, because the order of the predicted isolated audio signals is arbitrary, i.e., it should not matter whether the system returns the isolated audio signals as signals for {Bob,Alice} or as {Alice,Bob}.

After the error is computed, the system determines a reconstruction update to the parameter values of the speaker neural network and the separation neural network according to any suitable technique for updating neural network parameter values, e.g., backpropagation using gradient descent, in accordance with the computed error.

The system also computes total distance loss that measures an error in the per-time step representations over all of the time steps in the recording (step 310). As a particular example, the total distance loss can be equal to the sum of the minimums of the overall distance losses at each of the time steps in the recording.

After the error is computed, the system determines a speaker update to the parameter values of the speaker neural network and the embeddings in the embedding table according to any suitable technique for updating neural network parameter values, e.g., backpropagation using gradient descent, in accordance with the computed error.

Once the updates have been computed for all of the training recordings in the mini-batch, the system applies the updates to the current values of the parameters of the speaker neural network and the separation neural network, e.g., by adding the updates to the current values or subtracting the updates from the current values. The system also applies the updates to the current embeddings in the embedding table, e.g., by adding the updates to the current embeddings or subtracting the updates from the current embeddings.

In some cases, the system can generate the annotated training data by augmenting an initial training dataset to generate additional recordings that can be added to the training data.

To generate the additional recordings, the system obtains training data defining training recordings, with each training recording including speech from speakers of a plurality of training speakers. Then, the system samples segments of audio from the training recordings. The segments sampled can be of a predetermined length, or the segments can vary in length. After sampling the segments, the system generates a composite recording using the sampled segments, e.g., by concatenating the sampled segments together. For at least one of the segments used to generate the composite recording, the system can modify the gain of the segment according to a randomly sampled gain modifier.

By repeatedly performing these augmentation techniques, the system can increase the size of the initial training dataset in a manner that allows a model to be trained on the augmented training data set to achieve improved performance relative to the same model trained on the initial training dataset.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more computers, the method comprising:
   obtaining a recording comprising speech from a plurality of speakers;
   processing the recording using a speaker neural network having speaker parameter values, comprising:
      for each time step of multiple time steps, generating a respective set of per-time-step speaker representations, each per-time-step speaker representation representing features identifying a respective speaker in the recording for the time step;
   generating a plurality of per-recording speaker representations based on the respective sets of per-time-step speaker representations, wherein each per-recording speaker representation represents features of a respective identified speaker in the recording;
   processing the per-recording speaker representations and the recording using a separation neural network having separation parameter values, comprising:
      for each per-recording speaker representation of the per-recording speaker representations, generating a respective predicted isolated audio signal that corresponds to speech of one of the speakers in the recording;
   wherein the separation parameter values and the speaker parameters values are updated by training the speaker neural network and the separation neural network jointly using common training examples; wherein the speaker parameter values and the separation parameter values are updated by minimizing a separation loss between predicted isolated audio signals generated by the separation neural network and corresponding ground-truth audio signals in the common training samples, and the speaker parameter values are updated by minimizing a speaker loss, wherein the speaker loss measures, at each time step of the multiple time steps in a given common training example, (i) a first distance between a per-time-step speaker representation identifying a corresponding speaker and an embedding for the speaker for the time step and (ii) a second distance between two different per-time-step speaker representations at the same time step.

2. The method of claim 1, wherein generating the plurality of per-recording speaker representations based on the respective sets of per-time-step speaker representations comprises:
   clustering the respective sets of per-time-step speaker representations for the multiple time steps to generate a plurality of clusters of per-time-step speaker representations; wherein each cluster of the plurality of clusters corresponds to a different speaker; and
   generating the plurality of per-recording speaker representations by selecting a centroid of a different one of the plurality of clusters.

3. The method of claim 1, wherein the common training samples comprise a first recording and segments of audio from the first recording.

4. The method of claim 1, wherein the separation neural network comprises a stack of neural network blocks, wherein the stack of neural network blocks comprise a stack of residual convolutional blocks, each block of the stack of residual convolutional blocks includes one or more convolutional layers.

5. The method of claim 4, wherein each block of the stack of residual convolutional blocks is configured to process at least the plurality of per-recording speaker representations using feature-wise linear modulation, comprising:
   performing a linear transformation based on the plurality of per-recording speaker representations to generate a first vector and a second vector;
   performing an element-wise product operation between an output generated by one of the one or more convolutional layers and the first vector to generate an element-wise product; and
   adding the second vector with the element-wise product to generate an input for a non-linearity operation.

6. The method of claim 1, wherein the speaker loss includes a distance measure between a ground-truth speaker representation $E_{s_i}$ for a speaker $s_i$ and the $j^{th}$ per-time-step speaker representation for the speaker $s_i$ at time step t, wherein the speaker loss for time step t is defined as $$\|h_t^j - E_{s_i}\|^2 + \sum_{k \neq j}(\max(0, 1 - \|h_t^j - h_t^k\|^2)).$$

7. The method of claim 1, wherein the speaker loss includes a classifier loss generated based on a log softmax over distances between the respective sets of per-time-step speaker representations and the ground-truth speaker representations in the common training samples.

8. A system comprising one or more computers and one or more storage devices on which are stored instructions that are operable, when executed by the one or more computers, to cause the one or more computers to operations, the operations comprising:
   obtaining a recording comprising speech from a plurality of speakers;
   processing the recording using a speaker neural network having speaker parameter values, comprising:
      for each time step of multiple time steps, generating a respective set of per-time-step speaker representations, each per-time-step speaker representation representing features identifying a respective speaker in the recording for the time step;
   generating a plurality of per-recording speaker representations based on the respective sets of per-time-step speaker representations, wherein each per-recording speaker representation represents features of a respective identified speaker in the recording;
   processing the per-recording speaker representations and the recording using a separation neural network having separation parameter values, comprising:
      for each per-recording speaker representation of the per-recording speaker representations, generating a respective predicted isolated audio signal that corresponds to speech of one of the speakers in the recording;
   wherein the separation parameter values and the speaker parameters values are updated by training the speaker neural network and the separation neural network jointly using common training examples; wherein the speaker parameter values and the separation parameter values are updated by minimizing a separation loss between predicted isolated audio signals generated by the separation neural network and corresponding ground-truth audio signals in the common training samples, and the speaker parameter values are updated by minimizing a speaker loss, wherein the speaker loss measures, at each time step of the multiple time steps in a given common training example, (i) a first distance between a per-time-step speaker representation identifying a corresponding speaker and an embedding for the speaker for the time step and (ii) a second distance between two different per-time-step speaker representations at the same time step.

9. The system of claim 8, wherein generating the plurality of per-recording speaker representations based on the respective sets of per-time-step speaker representations comprises:
   clustering the respective sets of per-time-step speaker representations for the multiple time steps to generate a plurality of clusters of per-time-step speaker representations; wherein each cluster of the plurality of clusters corresponds to a different speaker; and
   generating the plurality of per-recording speaker representations by selecting a centroid of a different one of the plurality of clusters.

10. The system of claim 8, wherein the common training samples comprise a first recording and segments of audio from the first recording.

11. The system of claim 8, wherein the separation neural network comprises a stack of neural network blocks, wherein the stack of neural network blocks comprise a stack of residual convolutional blocks, each block of the stack of residual convolutional blocks includes one or more convolutional layers.

12. The system of claim 11, wherein each block of the stack of residual convolutional blocks is configured to process at least the plurality of per-recording speaker representations using feature-wise linear modulation, comprising:
   performing a linear transformation based on the plurality of per-recording speaker representations to generate a first vector and a second vector;
   performing an element-wise product operation between an output generated by one of the one or more convolutional layers and the first vector to generate an element-wise product; and
   adding the second vector with the element-wise product to generate an input for a non-linearity operation.

13. The system of claim 8, wherein the speaker loss includes a distance measure between a ground-truth speaker representation $E_{s_i}$ for a speaker $s_i$ and the $j^{th}$ per-time-step speaker representation for the speaker $s_i$ at time step t, wherein the speaker loss for time step t is defined as $$\|h_t^j - E_{s_i}\|^2 + \sum_{k \neq j}(\max(0, 1 - \|h_t^j - h_t^k\|^2)).$$

14. The system of claim 8, wherein the speaker loss includes a classifier loss generated based on a log softmax over distances between the respective sets of per-time-step speaker representations and the ground-truth speaker representations in the common training samples.

15. One or more non-transitory computer readable storage media storing instructions that, when executed by one or more processors, cause the one or more processors to perform operations, the operations comprising:

Obtaining a recording comprising speech from a plurality of speakers;
processing the recording using a speaker neural network having speaker parameter values, comprising:
   for each time step of multiple time steps, generating a respective set of per-time-step speaker representations, each per-time-step speaker representation representing features identifying a respective speaker in the recording for the time step;
generating a plurality of per-recording speaker representations based on the respective sets of per-time-step speaker representations, wherein each per-recording speaker representation represents features of a respective identified speaker in the recording;
processing the per-recording speaker representations and the recording using a separation neural network having separation parameter values, comprising:
   for each per-recording speaker representation of the per-recording speaker representations, generating a respective predicted isolated audio signal that corresponds to speech of one of the speakers in the recording;
wherein the separation parameter values and the speaker parameters values are updated by training the speaker neural network and the separation neural network jointly using common training examples; wherein the speaker parameter values and the separation parameter values are updated by minimizing a separation loss between predicted isolated audio signals generated by the separation neural network and corresponding ground-truth audio signals in the common training samples, and the speaker parameter values are updated by minimizing a speaker loss, wherein the speaker loss measures, at each time step of the multiple time steps in a given common training example, (i) a first distance between a per-time-step speaker representation identifying a corresponding speaker and an embedding for the speaker for the time step and (ii) a second distance between two different per-time-step speaker representations at the same time step.

16. The one or more non-transitory computer readable storage media of claim 15, wherein generating the plurality of per-recording speaker representations based on the respective sets of per-time-step speaker representations comprises:
   clustering the respective sets of per-time-step speaker representations for the multiple time steps to generate a plurality of clusters of per-time-step speaker representations; wherein each cluster of the plurality of clusters corresponds to a different speaker; and
   generating the plurality of per-recording speaker representations by selecting a centroid of a different one of the plurality of clusters.

17. The one or more non-transitory computer readable storage media of claim 15, wherein the common training samples comprise a first recording and segments of audio from the first recording.

18. The one or more non-transitory computer readable storage media of claim 15, wherein the separation neural network comprises a stack of neural network blocks, wherein the stack of neural network blocks comprise a stack of residual convolutional blocks, each block of the stack of residual convolutional blocks includes one or more convolutional layers.

19. The one or more non-transitory computer readable storage media of claim 18, wherein each block of the stack of residual convolutional blocks is configured to process at least the plurality of per-recording speaker representations using feature-wise linear modulation, comprising:

performing a linear transformation based on the plurality of per-recording speaker representations to generate a first vector and a second vector;

performing an element-wise product operation between an output generated by one of the one or more convolutional layers and the first vector to generate an element-wise product; and adding the second vector with the element-wise product to generate an input for a non-linearity operation.

20. The one or more non-transitory computer readable storage media of claim 15, wherein the speaker loss includes a distance measure between a ground-truth speaker representation $E_{s_i}$ for a speaker $s_i$ and the $j^{th}$ per-time-step speaker representation for the speaker $s_i$ at time step t, wherein the speaker loss for time step t is defined as $$\|h_t^j - E_{s_i}\|^2 + \sum_{k \neq j}(\max(0, 1 - \|h_t^j - h_t^k\|^2)).$$

21. The method of claim 1, wherein training the speaker neural network and the separation neural network jointly using common training examples comprises:

receiving one or more training examples each including a respective isolated speech signal for each speaker of annotated speakers in the training example;

for each of the one or more training examples, processing the training example using the speaker neural network to generate a respective set of per-time-step speaker representations for each time step of multiple time steps, and assigning each of the respective set of per-time-step speaker representations to a different one of the annotated speakers;

determining a speaker loss based on, for each speaker of the annotated speakers, (i) the per-time-step speaker representations assigned to the speaker by the speaker neural network and (ii) a reference embedding for the speaker;

generating a set of per-recording speaker representations for the annotated speakers based on the respective sets of per-time-step speaker representations;

processing the set of per-recording speaker representations for the annotated speakers using the separation neural network to generate a set of predicted isolated audio signals for the annotated speakers; and determining a separation loss based on (i) the set of predicted isolated audio signals for the annotated speakers and (ii) the respective isolated speech signals in the training example;

determining a reconstruction update to the separation parameter values and the speaker parameter values by minimizing the separation losses obtained for the one or more training examples, and further updating the speaker parameter values by minimizing the speaker losses obtained for the one or more training examples.

\* \* \* \* \*